Patented June 15, 1954

2,681,278

UNITED STATES PATENT OFFICE 2,681,278

WHOLE RYE BREAD MAKING

John J. Janis, Willoughby, Ohio

No Drawing. Application June 2, 1953,
Serial No. 359,215

6 Claims. (Cl. 99—90)

This invention relates to the art of bread making and is a continuation in part of my co-pending application to wit, John J. Janis, Serial No. 219,310 for Bread Making, filed April 4, 1951.

One of the primary objects of my invention is to produce an improved loaf of bread in which the flour that is used is one-hundred percent rye flour, to the exclusion of any other flour.

Another object is to provide an improved ready-mix, to which it is only necessary to add water and engage in ordinary bread making, the ready-mix to contain flour that is one-hundred percent rye flour, to the exclusion of any other flour, in order to obtain a superior one-hundred percent rye flour loaf of bread.

Another object is to provide a pure rye flour loaf of bread of light weight and with a grain comparable to that of wheat flour bread.

Another object of my invention is to provide a pure rye flour ready-mix and a process of producing a pure rye flour loaf of bread without the necessity of making a sponge.

Another object is to provide a pure rye flour ready-mix and a process of producing a pure rye flour loaf of bread without the necessity of making a sour.

Another object is to provide a pure rye flour ready-mix and a process of producing a pure rye flour loaf of bread without the necessity for fermentation.

There are many individuals who prefer, and others by reason of matters of prescribed diets, who find it advisable, and under physicians' orders, find it necessary to eat rye flour bread, containing absolutely no sugar and no wheat flour.

I am aware that one-hundred percent rye flour bread has been made. However, the conventional loaf in the baking process, shrinks to become a heavy soggy unpalatable bread that, for its size, weighs approximately four times that of a wheat flour bread. Its cost is prohibitive by comparison and its taste and composition unattractive to the consumer. As a consequence, the so-called rye bread available to the public rarely ever contains more than sixty percent rye flour mixed with a remaining forty percent of wheat flour. As is well known, wheat flour does have life far greater than rye flour and this is the reason for mixing it in with the rye flour to assist in resisting shrinkage during the baking of the dough to result in an aerated bread loaf with a grain through the inside of the loaf.

Generally speaking, I propose to provide a special composition in which flour used is one-hundred percent rye flour and a special process using yeast as the leaven to prevent shrinkage during the baking process, instead of using any wheat flour.

Specifically, I propose to make a one-package pure rye flour ready-mix for bread making to be sold to the public with simple instructions that are easily understandable so that the purchaser can readily be his own baker and obtain a hitherto unobtainable loaf of pure rye flour bread of light weight having a grain comparable to bakery produced wheat flour bread.

As a specific illustration, I propose to have as ingredients of my pure rye flour ready-mix, in the following proportions, by weight: one ounce of monobasic sodium phosphate, three ounces of diabasic sodium phosphate and two ounces of cornstarch. My purpose in using monobasic sodium phosphate is to prevent the bread crust from separating from the center of the loaf during the baking process. If diabasic sodium phosphate, alone, is used, there is a tendency for the bread to have a tunnel formed therein between the loaf body and the bread crust during the baking process due to the presence of acid. The purpose of using cornstarch is to prevent undue wetness.

The above named items are then blended, and to this mixture is added one pound of one-hundred percent pure rye flour and three-fourths of one ounce of dry yeast.

This mixture is preferably sifted several times and any flavoring that is desired may be added.

The purchaser of such a box of pure rye flour ready-mix as above described, may then proceed to make and bake a loaf of pure rye flour bread as follows: To each pound of the ready-mix mixture, there is preferably added thirteen ounces of water and mixed thoroughly with the ready-mix mixture. It is then put in a pan and permitted to rise, after which the loaf is placed in an oven and baked in accordance with usual preferred baking process.

The use of the above described ready-mix and process results in a loaf of pure rye bread weighing one and one-half pounds and which otherwise conforms in weight, size, grain and interior construction of an ordinary bakery loaf of wheat flour bread.

I am aware that others in the art have used plain rye flour in the making of sours. Wheat flour has often been referred to by other names than wheat. However, it is well known in the bread making art that pastry flour is winter wheat flour and that bread flour is spring wheat flour. The usual process of making rye flour sours is to add one cup of water to rye flour and leaven and let ferment for approximately four hours. Then two additional cups of water are added and let ferment for four hours. Then four cups of water are added and let ferment for four hours, and finally eight cups of water are let ferment for four hours. This makes a total of sixteen hours' time necessary in the usual process for making a sour. This sour then has added to it ten cups of water and is mixed with dough containing wheat flour, commonly known in the trade as bread flour. The resulting loaf, using this rye sour, is not a pure rye loaf of bread.

I claim:

1. A ready-mix for making a loaf of bread, to which it is only necessary to add water, mix, set aside to rise and then be baked in an oven, said ready-mix containing monobasic sodium phosphate, diabasic sodium phosphate, yeast and rye flour, to the exclusion of any other kind of flour.

2. A ready-mix for making a loaf of bread, to which it is only necessary to add water, mix, set aside to rise and then be baked in an oven, said ready-mix containing monobasic sodium phosphate, diabasic sodium phosphate, cornstarch, yeast and rye flour, to the exclusion of any other kind of flour.

3. A ready-mix for making a loaf of bread, to which it is only necessary to add water, mix, set aside to rise and then be baked in an oven, said ready-mix containing the following ingredients in relative proportions by weight, namely, one ounce of monobasic sodium phosphate, three ounces of diabasic sodium phosphate, two ounces of cornstarch, three-fourths of one ounce of dry yeast and one pound of rye flour, to the exclusion of any other kind of flour.

4. A loaf of rye flour bread containing monobasic sodium phosphate, diabasic sodium phosphate, water, yeast and rye flour, to the exclusion of any other kind of flour.

5. A loaf of rye flour bread containing monobasic sodium phosphate, diabasic sodium phosphate, cornstarch, water, yeast and rye flour, to the exclusion of any other kind of flour.

6. A loaf of rye flour bread containing the following ingredients in relative proportions by weight, namely, one ounce of monobasic sodium phosphate, three ounces of diabasic sodium phosphate, two ounces of cornstarch, water, three-fourths of one ounce of dry yeast and one pound of rye flour, to the exclusion of any other kind of flour.

References Cited in the file of this patent

De Gouy, The Bread Tray, Greenberg; pub. 1944, pages 175–176.